US012761686B2

(12) United States Patent
Hwang

(10) Patent No.: US 12,761,686 B2
(45) Date of Patent: Oct. 13, 2026

(54) CONTROLLER

(71) Applicants: Hyundai Motor Company, Seoul (KR); Kia Corporation, Seoul (KR)

(72) Inventor: Yun Jeong Hwang, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 17 days.

(21) Appl. No.: 18/929,831

(22) Filed: Oct. 29, 2024

(65) Prior Publication Data

US 2025/0224757 A1 Jul. 10, 2025

(30) Foreign Application Priority Data

Jan. 5, 2024 (KR) ........................ 10-2024-0002178

(51) Int. Cl.

| | |
|---|---|
| ***B60K 35/10*** | (2024.01) |
| ***B60H 1/00*** | (2006.01) |
| ***B60K 23/02*** | (2006.01) |
| ***B60K 26/02*** | (2006.01) |
| ***B60N 2/20*** | (2006.01) |
| ***B60N 2/75*** | (2018.01) |
| ***B60W 60/00*** | (2020.01) |
| ***B62D 1/12*** | (2006.01) |
| ***G05G 13/00*** | (2006.01) |

(52) U.S. Cl.

CPC ........... *G05G 13/00* (2013.01); *B60H 1/0065* (2013.01); *B60K 23/02* (2013.01); *B60K 26/02* (2013.01); *B60K 35/10* (2024.01); *B60N 2/20* (2013.01); *B60N 2/797* (2018.02); *B60W 60/005* (2020.02); *B62D 1/12* (2013.01); *B60K 2026/029* (2013.01)

(58) Field of Classification Search

CPC ................................ B60N 2/797; B60K 35/10

See application file for complete search history.

(56) References Cited

U.S. PATENT DOCUMENTS

| | | | | |
|---|---|---|---|---|
| 5,244,066 A * | 9/1993 | Mackoway | E02F 9/2004 74/491 | |
| 5,566,586 A | 10/1996 | Lauer et al. | | |
| 9,586,595 B2 * | 3/2017 | Fairgrieve | B60W 50/085 | |
| 11,117,495 B2 * | 9/2021 | Heath | B60N 2/757 | |
| 11,634,886 B2 * | 4/2023 | Krivenkov | G05G 9/047 74/507 | |
| 2003/0184123 A1 * | 10/2003 | Amamiya | B60N 2/797 296/190.01 | |

(Continued)

FOREIGN PATENT DOCUMENTS

| | | | |
|---|---|---|---|
| CN | 113771707 A * | 12/2021 | B60N 2/753 |
| CN | 115892182 A * | 4/2023 | B66F 9/0759 |

(Continued)

*Primary Examiner* — Nicole T Verley

(74) *Attorney, Agent, or Firm* — Morgan, Lewis & Bockius LLP

(57) ABSTRACT

A controller allows an occupant, who is seated in a seat, to conveniently manipulate a traveling function and various convenience functions, which are provided in an internal, by use of a single control unit so that the convenience in using convenience functions, such as autonomous driving functions, manual traveling functions, air conditioning, sound, and internal brightness, may be improved, improving the satisfaction of the occupant.

15 Claims, 6 Drawing Sheets

(56) References Cited

U.S. PATENT DOCUMENTS

| | | | | |
|---|---|---|---|---|
| 2006/0061178 | A1* | 3/2006 | Billger | B66F 9/07545 297/344.21 |
| 2016/0315488 | A1* | 10/2016 | Moon | H02J 7/0047 |
| 2019/0383386 | A1* | 12/2019 | Harris | F16H 59/08 |
| 2020/0247273 | A1* | 8/2020 | Heath | B60N 2/753 |
| 2022/0001782 | A1* | 1/2022 | Haller | B60N 2/797 |
| 2022/0121202 | A1* | 4/2022 | Lyzen | A01D 34/008 |
| 2023/0091680 | A1* | 3/2023 | Lee | B60N 2/773 297/411.32 |
| 2023/0189412 | A1* | 6/2023 | Dimberg | H05B 45/24 307/31 |

FOREIGN PATENT DOCUMENTS

| | | | | | |
|---|---|---|---|---|---|
| DE | 102005036624 | A1 | * | 2/2007 | B60K 35/10 |
| DE | 102016106030 | B4 | * | 5/2022 | B60K 35/10 |
| EP | 3819154 | A1 | * | 5/2021 | B60K 26/02 |
| GB | 2458283 | A | * | 9/2009 | G05G 1/62 |
| KR | 10-2149569 | B1 | | 8/2020 | |
| KR | 10-2023-0160576 | A | | 11/2023 | |
| WO | WO-2016135058 | A1 | * | 9/2016 | G06F 3/00 |
| WO | WO-2022235739 | A1 | * | 11/2022 | B62D 5/046 |

* cited by examiner

CONTROLLER

CROSS-REFERENCE TO RELATED APPLICATION

The present application claims priority to Korean Patent Application No. 10-2024-0002178, filed on Jan. 5, 2024, the entire contents of which is incorporated herein for all purposes by this reference.

BACKGROUND OF THE PRESENT DISCLOSURE

Field of the Present Disclosure

The present disclosure relates to a controller capable of allowing an occupant, who is seated in a seat, to conveniently manipulate various convenience functions provided in an interior, thereby improving the convenience for the occupant.

Description of Related Art

Recently, urban air mobility (UAM), purpose-built vehicles (PBV), and hubs (mobility transit hubs) have been in the limelight as future autonomous mobility vehicles, and various visions and advanced technology developments have been initiated in this regard.

The purpose-built vehicles (PBVs, purpose-built mobility) are electric vehicle-based ground transportation means that are moved by electric wheels that move freely in 360 degrees instead of the wheels of a vehicle. The PBVs are not only used as a means of transportation, but also to provide personalized services to passengers as they travel to their destination. The personalized design of the PBVs means that they can function as city shuttles, provide leisure spaces such as restaurants, cafes, and hotels, and may be transformed into various spaces such as hospitals, pharmacies, and other socially essential facilities. To the present end, an interior of a vehicle body may be customized by use of products modularized to suit the purpose thereof.

The PBV provides various convenience functions as well as traveling functions. However, means for manipulating and controlling various provided functions are complicated, which makes it impossible to efficiently use various functions.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a controller configured for allowing an occupant, who is seated in a seat, to conveniently manipulate various convenience functions provided in an internal, improving the convenience for the occupant.

To achieve the above-mentioned object, the present disclosure provides a controller including: a body provided in an internal space, in which a seat is provided, and configured to be travelable by a drive module; a convenience provision portion movably provided in the internal space and configured to provide convenience functions including an air conditioning function; and a control unit rotatably provided at a position, at which an occupant manipulates the control unit, and including a plurality of manipulation surfaces configured to be exposed to the occupant seated in the seat in accordance with a rotation position of the control unit, the control unit including operators provided on the manipulation surfaces and configured to control traveling or the convenience provision portion.

The seat may include an armrest on which the occupant's arm is mounted, and the control unit may be rotatably provided on the armrest.

The control unit may include a steering manipulation means configured to control the drive module, and the steering manipulation means may be configured as a lever, a dial, or a button and is configured to control a traveling direction of the drive module.

The control unit may include a steering manipulation means configured to control the drive module, the steering manipulation means may include a lever, and a dial rotatably mounted at an end portion of the lever, the lever may be configured for controlling a traveling direction by the drive module in accordance with a manipulation direction, and the dial may be configured to select a gear shifting position.

The drive module may be configured to adjust a vehicle height, the lever of the steering manipulation means may be configured to be manipulated in an upward and downward direction, and the vehicle height may be adjusted by the manipulation of the lever in the upward and downward direction thereof.

When the occupant is configured to control the steering manipulation means, the drive module may switch to a manual traveling mode by control of the steering manipulation means.

When the occupant does not control the steering manipulation means, the drive module may switch to an autonomous driving mode.

The control unit may include a mode manipulation means configured to adjust the rotation position of the control unit, and the mode manipulation means may be configured to determine a manual traveling mode or an autonomous driving mode based on whether the mode manipulation means is manipulated.

The convenience provision portion may further include a lighting function and a sound function, the control unit may include a convenience function manipulation means configured to control the convenience provision portion, and the convenience function manipulation means may be configured as a button type and configured to select the function of the convenience provision portion.

The convenience function manipulation means may include: a button configured to control a movement position of the convenience provision portion; a button configured to control lighting brightness of the convenience provision portion; a button configured to control sound volume of the convenience provision portion, and a button configured to control the air conditioning function.

The seat or the control unit may include a position manipulation means configured to fix or release the rotation position of the control unit.

The seat may be configured to adjust positions and angles of a seatback and a seat cushion, and the seat may include a seat manipulation means configured to adjust the positions and the angles of the seatback and the seat cushion.

The convenience provision portion may be formed to extend along an internal peripheral surface of the internal space, and the functions including the air conditioning function may be implemented toward the occupant in the internal space.

According to the controller structured as described above, the occupant, who is seated in the seat, may conveniently manipulate the traveling function and various convenience functions, which are provided in, the interior, by use of the single control unit so that the convenience in using convenience functions, such as autonomous driving functions, manual traveling functions, air conditioning, sound, and internal brightness, may be improved, improving the satisfaction of the occupant.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
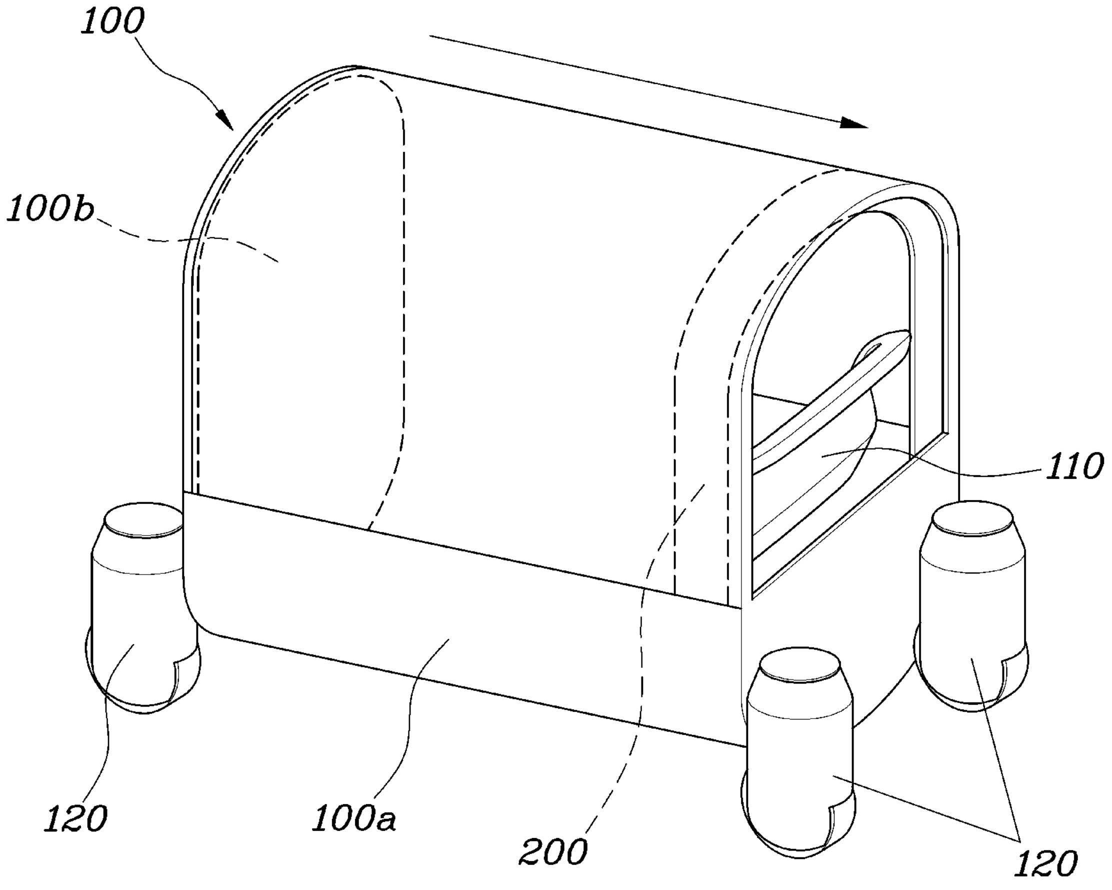
FIG. 1 is a view exemplarily illustrating a controller according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments included in the present specification will be described in detail with reference to the accompanying drawings. The same or similar constituent elements are assigned with the same reference numerals regardless of reference numerals, and the repetitive description thereof will be omitted.

The suffixes “module”, “unit”, “part”, and “portion” used to describe constituent elements in the following description are used together or interchangeably to facilitate the description, but the suffixes themselves do not have distinguishable meanings or functions.

In the description of the embodiments disclosed in the present specification, the specific descriptions of publicly known related technologies will be omitted when it is determined that the specific descriptions may obscure the subject matter of the embodiments disclosed in the present specification. Furthermore, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present disclosure.

The terms including ordinal numbers such as “first,” “second,” and the like may be used to describe various constituent elements, but the constituent elements are not limited by the terms. These terms are used only to distinguish one constituent element from another constituent element.

When one constituent element is described as being “coupled” or “connected” to another constituent element, it should be understood that one constituent element can be coupled or connected directly to another constituent element, and an intervening constituent element can also be present between the constituent elements. When one constituent element is described as being “coupled directly to” or “connected directly to” another constituent element, it should be understood that no intervening constituent element is present between the constituent elements.

Singular expressions include plural expressions unless clearly described as different meanings in the context.

In the present specification, it should be understood the terms “comprises,” “comprising,” “includes,” “including,” “containing,” “has,” “having” or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Hereinafter, a controller according to an exemplary embodiment of the present disclosure will be described with reference to the accompanying drawings.

The controller according to an exemplary embodiment of the present disclosure includes a body 100 and a convenience provision portion 200.

The body 100 includes an internal space, and at least one seat 110 is provided in the internal space.

The body 100 may include a bottom portion 100*a* and a cover portion 100*b*. The cover portion 100*b* may be made of a transparent material so that a visual field of the inside and the outside of the body 100 may be ensured.

Furthermore, drive modules 120, which are configured to be travelable, may be provided on the body 100. Four drive modules 120 may be provided on a lower portion of the body 100 and implement four-wheel drive. The drive modules 120 may travel while individually or simultaneously operating.

The drive module 120 may have integrated traveling, steering, braking, and suspension functions and be configured to perform autonomous driving.

The mobility may be imparted to the body 100 by the drive module 120 so that the drive modules 120 may move the body 100 to a desired destination, or the position of the body 100 may be adjusted to suit the purpose of use by adjusting a height by the suspension function.

Meanwhile, the convenience provision portion 200 is provided in the body 100, and the convenience provision portion 200 may be movably provided in the internal space of the body 100 and provide convenience functions including an air conditioning function.

The convenience provision portion 200 may be provided as a plurality of convenience provision portions 200 in the internal space and provide various functions such as a sound function and a lighting function in addition to the air conditioning function.

Therefore, the convenience provision portion 200 may move in the internal space of the body 100 by a rail structure. The convenience provision portion 200 may be connected to a Heating, Ventilation, and Air Conditioning (HVAC) and provide the internal space with air conditioning air provided from the HVAC. Furthermore, a speaker may be provided so that an occupant may transmit desired music or messages. Furthermore, the occupant may provide various lighting functions to the internal through a lighting device including an LED.

The convenience provision portion 200 may extend along an internal peripheral surface of the internal space and be configured to implement the functions including the air conditioning function to the occupant in the internal space.

That is, the convenience provision portion 200 may be formed in an annular shape and include a shape extending along the internal peripheral surface of the internal space. The convenience provision portion 200 may move to a position optimized for various types of functions desired by the occupant and provide the occupant with various types of functions including the air conditioning function, the sound function, the lighting function, and the like.

Therefore, the controller according to an exemplary embodiment of the present disclosure may be moved to a destination by the drive module 120 of the body 100 and provide various convenience functions through the convenience provision portion 200 in the internal space in the body 100.

In an exemplary embodiment of the present disclosure, a control unit 300 for integrally controlling the traveling function and the convenience function is provided.

The control unit 300 is provided to be rotatable at a position at which the occupant may manipulate the control unit 300. A plurality of manipulation surfaces is provided and exposed to the occupant seated in the seat 110 in accordance with the rotation position. Operators for controlling the traveling or the convenience provision portion 200 may be respectively provided on the manipulation surfaces.

In the instant case, the position at which the occupant may manipulate the control unit may be the seat 110. The control unit is rotatably provided on the seat 110, and the position of the manipulation surface, on which the operator is provided, may be changed in accordance with the rotation position. That is, the manipulation surfaces, which are viewed in the state in which the occupant is seated in the seat 110, are changed in accordance with the rotation position of the control unit 300. The different operators may be provided on the manipulation surfaces so that the occupant may be configured for controlling the operator including the desired function by rotating the control unit 300.

Figure 2:
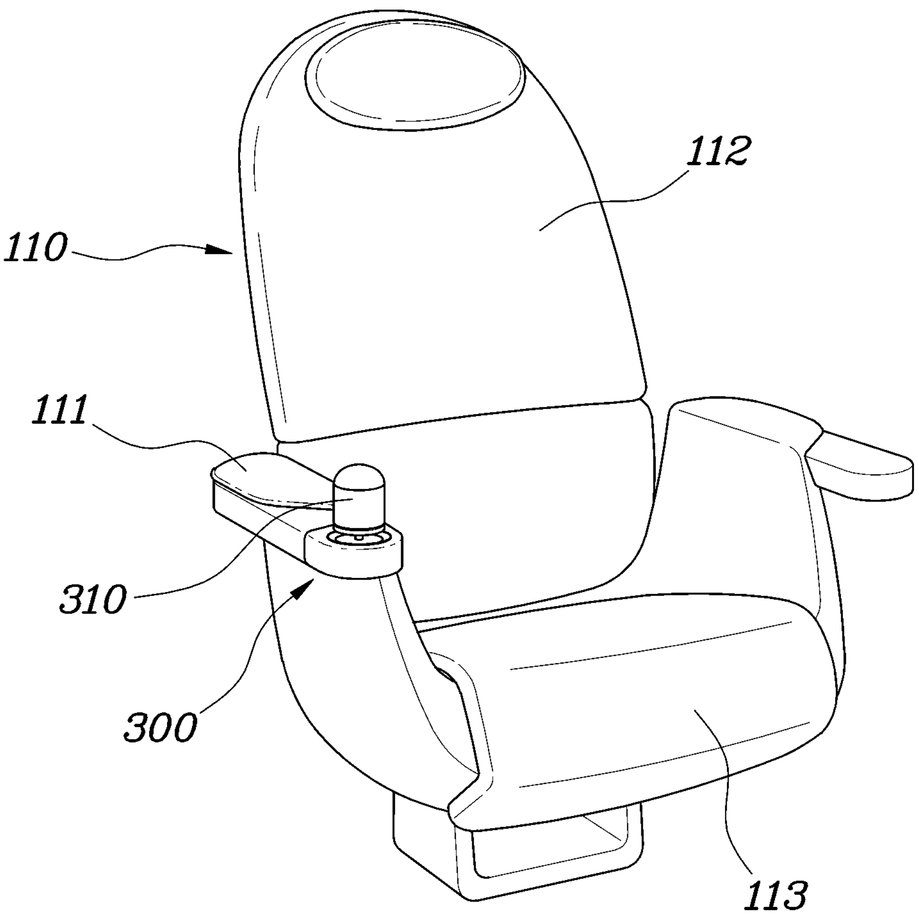
FIG. 2 is a view exemplarily illustrating a seat and a control unit of the controller illustrated in FIG. 1.

As illustrated in FIG. 2, armrests 111, on which the occupant's arm is mounted, may be provided on the seat 110, and the control unit 300 may be rotatably provided on the armrest 111.

Therefore, the occupant may conveniently manipulate the control unit 300 in the state in which the occupant is seated in the seat 110 and places his or her arm on the armrest 111.

Furthermore, the control unit 300 may be provided on a portion of the armrest 111 on which the occupant's hand is positioned. Because the control unit 300 is rotatably provided on the armrest 111, the operators may be selectively manipulated by changing the manipulation surfaces.

The plurality of operators according to an exemplary embodiment of the present disclosure will be described below.

The control unit 300 includes a steering manipulation means 310 for controlling the drive module 120. The steering manipulation means 310 may be configured as a lever type, a dial type, or a button type and control the traveling direction of the drive module 120.

That is, the steering manipulation means 310 is provided to control the traveling direction by manipulating the drive module 120 and configured as a lever type, a dial type, or a button type.

The steering manipulation means 310 may be configured as a lever type which may be conveniently manipulated in terms of a human body structure. The body 100 may be moved to a desired destination by operation of the drive module 120 that operates in conjunction with the manipulation of the steering manipulation means 310.

Figure 3:
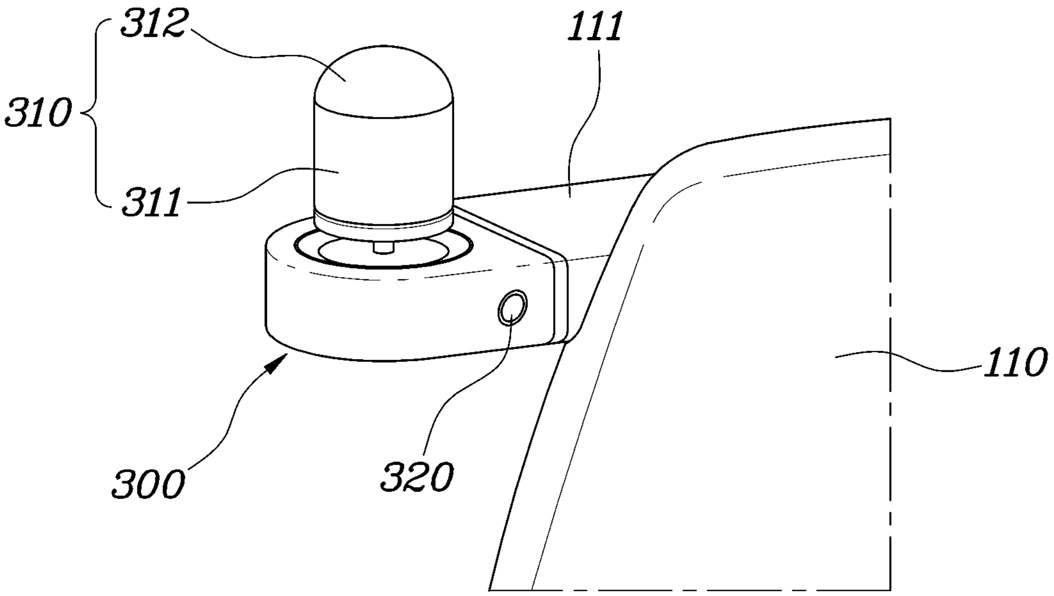
FIG. 3 is a view exemplarily illustrating a steering manipulation means and a mode manipulation means of the control unit of the controller according to an exemplary embodiment of the present disclosure.

As illustrated in FIG. 3, the steering manipulation means 310 may include a lever 311, and a dial 312 mounted at an end portion of the lever 311. The lever 311 may be configured to control the traveling direction by the drive module 120 in accordance with the manipulation direction, and the dial 312 may be configured to select a gear shifting position.

The plurality of manipulation surfaces is provided on the control unit 300, and the steering manipulation means 310 is provided on any one of the plurality of manipulation surfaces.

In the instant case, the steering manipulation means 310 may be configured as the lever 311. When the occupant directly manipulates the steering manipulation means 310, the traveling direction of the drive module 120 may be controlled. Furthermore, the steering manipulation means 310 may further include the dial 312 provided at the end portion of the lever 311, and the gear shifting position may be selected by the manipulation of the dial 312.

As described above, when the occupant directly manipulates the steering manipulation means 310, the gear stage is changed to the drive stage or the rearward drive stage by the dial 312, and then the traveling is performed by manipulating the lever 311 so that the traveling stability may be ensured. In the instant case, the dial 312 of the steering manipulation means 310 may provide various gear shifting positions such as a neutral gear stage and a parking stage.

Furthermore, the lighting function may be added to the dial 312 of the steering manipulation means 310. Therefore, the internal lighting function of the dial 312 may implement high-grade quality in a state in which the steering manipulation means 310 is not used or the steering manipulation means 310 is moved downward.

As described above, the lever 311 and the dial 312 of the steering manipulation means 310 are integrated so that the steering manipulation means 310 may be manipulated in accordance with the traveling and the gear shifting required for the traveling, and the convenience of use may be improved.

Meanwhile, the drive module 120 may be configured to adjust a vehicle height.

Therefore, the lever 311 of the steering manipulation means 310 may be configured to be manipulated in an upward and downward direction so that the vehicle height may be adjusted by manipulating the lever 311 in the upward and downward direction thereof.

As described above, the steering manipulation means 310 may be configured to adjust the suspension function of the drive module 120 as well as the traveling function of the drive module 120. To the present end, the steering manipulation means 310 may be configured to be manipulated in the upward and downward direction thereof. The vehicle height may be increased when the steering manipulation means 310 is pulled upward, and the vehicle height may be decreased when the steering manipulation means 310 is pushed downward.

As described above, because the traveling function control and the suspension function control are integrated into the drive module 120, the steering manipulation means 310 may be configured for controlling all the functions related to the traveling only by manipulating the steering manipulation means 310.

Meanwhile, in case that the occupant controls the steering manipulation means 310, the drive module 120 may switch to a manual traveling mode by controlling the steering manipulation means 310.

That is, when the occupant manipulates the steering manipulation means 310, the occupant directly controls the traveling by applying the occupant's intention so that the drive module 120 travels in accordance with the manipulation of the steering manipulation means 310.

In the instant case, in case that the occupant controls the steering manipulation means 310, an instruction message according to the manual traveling may be transmitted to the occupant before the mode is changed to the manual traveling mode. The mode may be changed to the manual traveling mode after the occupant's intention of the manual traveling is finally identified so that the safe traveling may be performed.

Meanwhile, in case that the occupant does not control the steering manipulation means 310, the drive module 120 may switch to the autonomous driving mode. The situation in which the steering manipulation means 310 is not controlled may be a situation in which the manipulation surface including the steering manipulation means 310 is changed to another manipulation surface. That is, in case that the occupant does not control the steering manipulation means 310, the occupant is not directly involved in the traveling so that the drive module 120 travels in the autonomous driving mode so that the drive module 120 automatically moves toward a predetermined destination.

As described above, the manual traveling mode or the autonomous driving mode may be performed by the manipulation of the steering manipulation means 310, and the stable traveling may be performed by applying a driver's intention.

Furthermore, the control unit 300 includes a mode manipulation means 320 for adjusting the rotation position of the control unit 300, and the manual traveling mode or the autonomous driving mode may be determined based on whether the mode manipulation means 320 is manipulated.

The rotation position of the control unit 300 may be adjusted based on whether the mode manipulation means 320 is manipulated. To implement the autonomous driving mode, the steering manipulation means 310 may be moved downwards to prevent the occupant's forcible manipulation. Alternatively, to implement the manual traveling mode, the steering manipulation means 310 may be moved upward to allow the occupant to manipulate the steering manipulation means 310 to perform the traveling.

As described above, because the mode manipulation means 320 is provided, the autonomous driving mode or the manual manipulation mode may be conveniently changed.

Meanwhile, in an exemplary embodiment of the present disclosure, the convenience provision portion 200 further includes the lighting function and the sound function.

Figure 4:
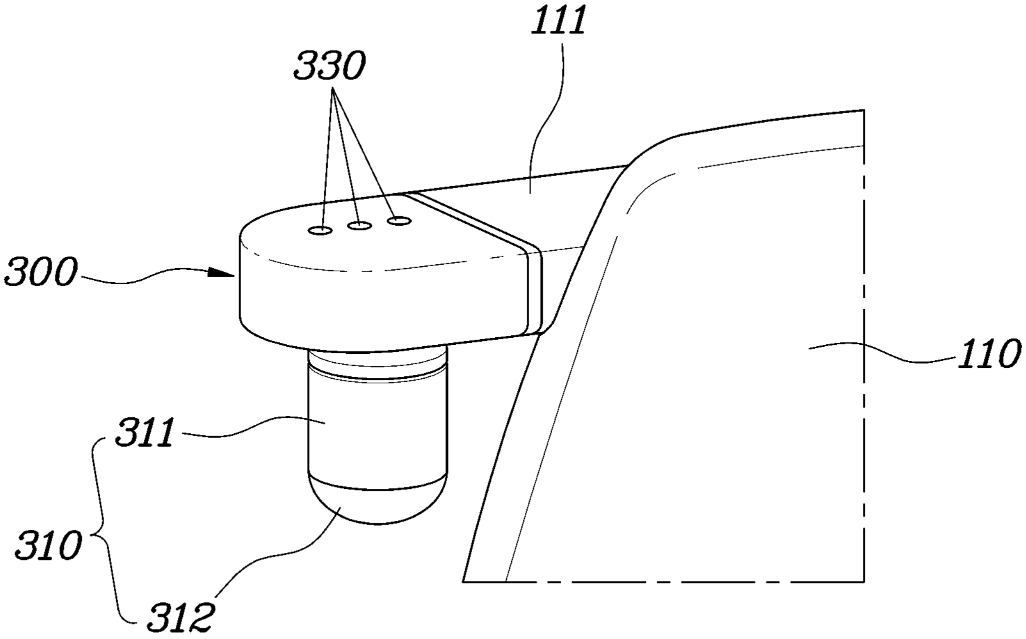
FIG. 4 is a view exemplarily illustrating a convenience function manipulation means of the control unit of the controller according to an exemplary embodiment of the present disclosure.

As illustrated in FIG. 4, the control unit 300 includes a convenience function manipulation means 330 for controlling the convenience provision portion 200. The convenience function manipulation means 330 may be configured as a button type and select the function of the convenience provision portion 200.

The plurality of manipulation surfaces may be provided on the control unit 300, and the convenience function manipulation means 330 may be provided on any one of the plurality of manipulation surfaces. For example, the manipulation surface, on which the convenience function manipulation means 330 is provided, may be provided at a side opposite to the manipulation surface on which the steering manipulation means 310 is provided.

That is, the convenience function manipulation means 330 is configured to select and control various functions provided from the convenience provision portion 200. The convenience function manipulation means 330 may be configured as a button type for manipulation convenience.

Therefore, when the control unit 300 is rotated by the occupant and positioned so that the manipulation surface, on which the convenience function manipulation means 330 is provided, is exposed, the convenience function manipulation means 330 may be controlled to move the position of the convenience provision portion 200, and various convenience functions of the convenience provision portion 200 may be manipulated.

In the instant case, the convenience function manipulation means 330 may include a button configured to control a movement position of the convenience provision portion 200, a button configured to adjust lighting brightness of the convenience provision portion 200, a button configured to adjust sound volume of the convenience provision portion 200, and a button configured to control the air conditioning function.

That is, in the convenience function manipulation means 330, the button configured to control the movement position of the convenience provision portion 200 may be divided into two buttons so that the convenience provision portion 200 may be moved forward or rearward thereof. The button configured to adjust the lighting brightness may be divided into two buttons so that the brightness of the lighting may be adjusted to be dimmed or bright and divided for each situation mode to adjust a color temperature. Furthermore, the button configured to adjust the sound volume and the button configured to control the air conditioning function may be configured as the dial 312 so that the sound function and the air conditioning function may be variously selected in accordance with the occupant's preference such as a sound mode, a sound position, an air conditioning mode, an air conditioning temperature, and an air conditioning intensity.

Figure 5:
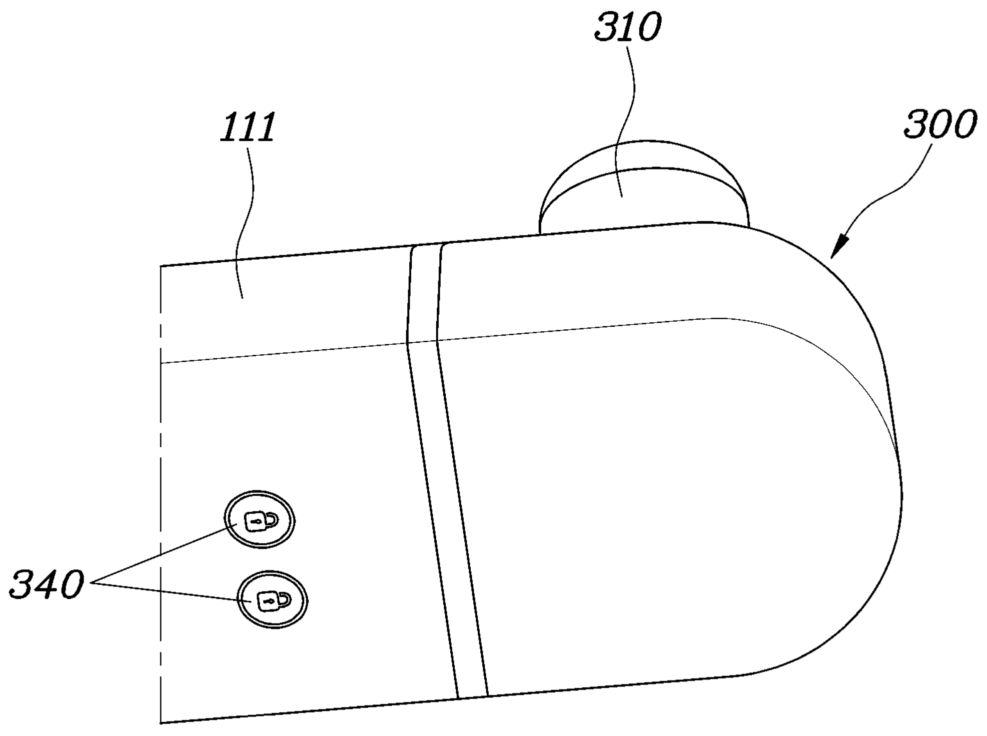
FIG. 5 is a view exemplarily illustrating a position manipulation means of the control unit of the controller according to an exemplary embodiment of the present disclosure.

Meanwhile, as illustrated in FIG. 5, the seat 110 or the control unit 300 may include a position manipulation means 340 to fix or release the rotation position of the control unit 300.

The control unit 300 may be rotatably provided on the seat 110, and the rotation position of the control unit 300 may be fixed by a separate locking structure. Various shapes, such as an electromagnet and a push-and-latch, may be applied as the locking structure, the locking structure may be configured to perform the unlocking based on whether the position manipulation means 340 is manipulated.

That is, the position manipulation means 340 is configured to control the locking state of the locking structure. When the position manipulation means 340 is manipulated, the locking state may be released so that the rotation of the control unit 300 is allowed.

When the locking state is released by the manipulation of the position manipulation means 340, the rotation position of the control unit 300 may be automatically changed by operation of a motor so that a particular manipulation surface may be exposed to the occupant. In an exemplary embodiment of the present disclosure, the motor may be electrically connected to a processor to control the operation of the motor.

As may be seen from FIG. 3, the position manipulation means 340 may be provided between the manipulation surface, on which the steering manipulation means 310 is provided, and the manipulation surface on which the convenience function manipulation means 330 is provided. The position manipulation means 340 may be provided on the seat 110 and disposed adjacent to the control unit 300.

As described above, the rotation position of the control unit 300 is adjusted by the position manipulation means 340 in accordance with the occupant's intention so that the occupant may recognize the manipulation of the control unit 300.

Meanwhile, the seat 110 is configured so that positions and angles of a seatback 112 and a seat cushion 113 may be adjusted.

To adjust the seat 110, the seat 110 may include a seat manipulation means 350 for adjusting the positions and angles of the seatback 112 and the seat cushion 113.

Figure 6:
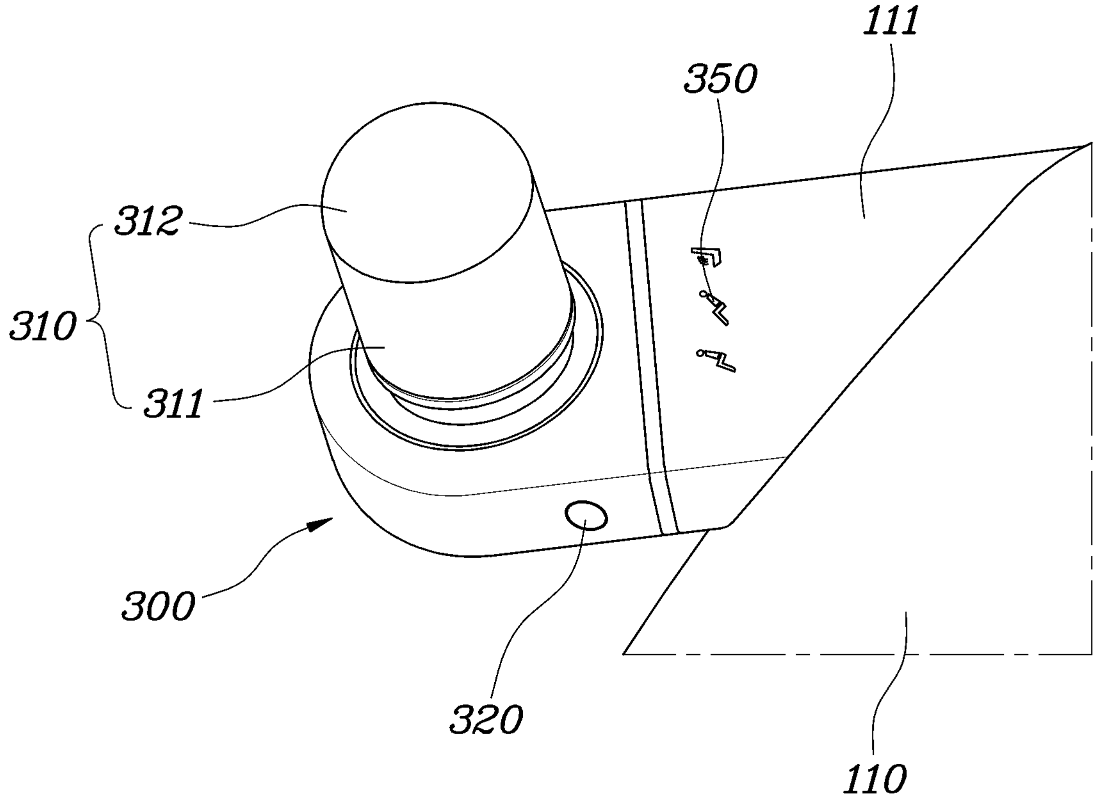
FIG. 6 is a view exemplarily illustrating a seat manipulation means of the control unit of the controller according to an exemplary embodiment of the present disclosure.

As illustrated in FIG. 6, the seat 110 may include a seat manipulation means 350, and the seat manipulation means 350 may be provided on the armrest 111.

That is, the seat 110, including the position movement of the seat 110, the angle of the seatback 112, and the angle of the seat cushion 113, may be adjusted to be optimized for the seating posture of the occupant, and the present optimization may be automated in accordance with the control of the seat manipulation means 350.

The seat manipulation means 350 is integrated with a switch for adjusting the seatback 112 and the seat cushion 113 of the seat 110. The seat manipulation means 350 may be provided on the seat 110 to adjust the posture of the seat 110 regardless of the rotation position of the control unit 300.

According to the controller structured as described above, the occupant, who is seated in the seat 110, may conveniently manipulate the traveling function and various convenience functions, which are provided in, the interior, by use of the single control unit 300 so that the convenience in using convenience functions, such as autonomous driving functions, manual traveling functions, air conditioning, sound, and internal brightness, may be improved, improving the satisfaction of the occupant.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A controller comprising:

a body provided in an internal space, in which a seat is provided, and configured to be travelable by a drive module;

a convenience provision portion movably provided in the internal space and configured to provide convenience functions including an air conditioning function; and a control unit rotatably provided at a position, at which an occupant manipulates the control unit, and including a plurality of manipulation surfaces configured to be exposed to the occupant seated in the seat in accordance with a rotation position of the control unit, the control unit including operators provided on the manipulation surfaces and configured to control traveling or the convenience provision portion, wherein the control unit is provided at a front portion of an armrest, and the front portion of the armrest is configured to be rotatable with respect to a remaining rear portion of the armrest, and wherein the control unit includes a steering manipulation means configured to control the drive module, the steering manipulation means includes a lever, and a dial rotatably mounted at an end portion of the lever, the lever controls a traveling direction of the drive module in accordance with a manipulation direction, and the dial is configured to select a gear shifting position in response to operation of the dial.

2. The controller of claim 1, wherein the control unit is provided on the front portion of the armrest of the seat, on which the occupant's arm is mounted.

3. The controller of claim 1, wherein the steering manipulation means is further configured as a button and is configured to control the traveling direction of the drive module.

4. The controller of claim 1, wherein the drive module is configured to adjust a vehicle height, the lever of the steering manipulation means is configured to be manipulated in an upward and downward direction, and the vehicle height is adjusted by the manipulation of the lever in the upward and downward direction to control the drive module.

5. The controller of claim 1, wherein in response that the occupant controls the steering manipulation means, the drive module switches to a manual traveling mode by control of the steering manipulation means.

6. The controller of claim 1, wherein in response that the occupant does not control the steering manipulation means, the drive module switches to an autonomous driving mode.

7. The controller of claim 1, wherein, in response that the steering manipulation means is rotated downwards, an autonomous driving mode is implemented.

8. The controller of claim 1, wherein, in response that the steering manipulation means is rotated upwards, a manual traveling mode is implemented.

9. The controller of claim 1, wherein the control unit includes a mode manipulation means configured to adjust the rotation position of the control unit, and the mode manipulation means is configured to determine a manual traveling mode or an autonomous driving mode based on whether the mode manipulation means is manipulated.

10. The controller of claim 1, wherein the convenience provision portion further includes a lighting function and a sound function, the control unit includes a convenience function manipulation means configured to control the convenience provision portion, and the convenience function manipulation means is configured as a button and configured to select the lighting function and the sound function of the convenience provision portion.

11. The controller of claim 10, wherein the button of the convenience function manipulation means includes:

a button configured to control a movement position of the convenience provision portion;

a button configured to control lighting brightness of the convenience provision portion;

a button configured to control sound volume of the convenience provision portion; and a button configured to control the air conditioning function.

12. The controller of claim 1, wherein the seat or the control unit includes a position manipulation means configured to fix or release the rotation position of the control unit.

13. The controller of claim 12, wherein in response that a locking state is released by manipulation of the position manipulation means, the rotation position of the control unit is automatically changed so that a predetermined manipulation surface among the plurality of manipulation surfaces is exposed to the occupant.

14. The controller of claim 1, wherein the seat is configured to adjust positions and angles of a seatback and a seat cushion, and the seat includes a seat manipulation means configured to adjust the positions and the angles of the seatback and the seat cushion.

15. The controller of claim 1, wherein the convenience provision portion is formed to extend along an internal peripheral surface of the internal space, and the convenience functions including the air conditioning function are implemented toward the occupant in the internal space.

* * * * *